Feb. 3, 1970 D. N. BROMAGE 3,493,172
COUNTING DEVICE
Filed Aug. 19, 1968

INVENTOR.
DENNIS NORMAN BROMAGE
BY Brumbaugh, Graves,
Donohue & Raymond
his ATTORNEYS 
United States Patent Office 3,493,172
Patented Feb. 3, 1970

3,493,172
COUNTING DEVICE
Dennis N. Bromage, Worplesdon, Surrey, England, assignor to Iliffe-NTP, Inc., New York, N.Y., a corporation of Delaware
Filed Aug. 19, 1968, Ser. No. 753,433
Int. Cl. G06c 27/00; G09f 9/00
U.S. Cl. 235—114   5 Claims

ABSTRACT OF THE DISCLOSURE

A counting device is provided having a windowed casing, an operating plunger, a series of interrelated, scale-bearing wheels and a provision for selectively setting the wheels. The wheels are arranged so that the scale on one wheel records the number of plunger operations which have been made while the scales on the other wheels record the difference after subtraction of this number from a preset amount.

---

This invention relates generally to counting devices and more particularly to hand-held and hand-operated counting devices which are adapted to register a succession of entries.

In accordance with the present invention, a counting device is provided which includes a casing enclosing a finger-operated, reciprocating plunger having return biasing means, first and second rotatably mounted wheels having graduated scales and correspondingly spaced ratchet teeth, and windows in the casing for reading each of the scales. The wheels are arranged so that the scale of the first wheel records the number of plunger operations which have been made while the scale of the second wheel records the difference after subtraction of this number from a preset amount. The plunger may be mounted to operate along a line between the axes of the wheels, and may include two fingers, one on each side of the plunger, so that operation of the plunger brings the fingers into engagement with the ratchet teeth of the wheels to thereby move the wheels in opposite directions of rotation.

Preferably, a third ratchet-toothed, scale-bearing wheel is provided which is adapted to be moved by one scale graduation for each revolution of the second wheel by means of a projection carried by the second wheel. Each wheel may project beyond the walls of the casing so that an operator may manually zero or preset the scales. Each of the wheels is resiliently mounted between a spring washer carried by the rear wall of the casing and a rearwardly extending projection carried by the front wall of the casing. Matching serrations are provided on the front surface of each wheel and on the inner surface of each projection, the serrations being in correspondence with the respective scales of the wheels, so that each wheel may be rotated step by step through one scale graduation at a time without slippage.

THE DRAWINGS

For a better understanding of the invention reference may be made to the following description of a representative embodiment, taken in conjunction with the figures of the accompanying drawings in which.

THE DESCRIPTION

Figure 1:
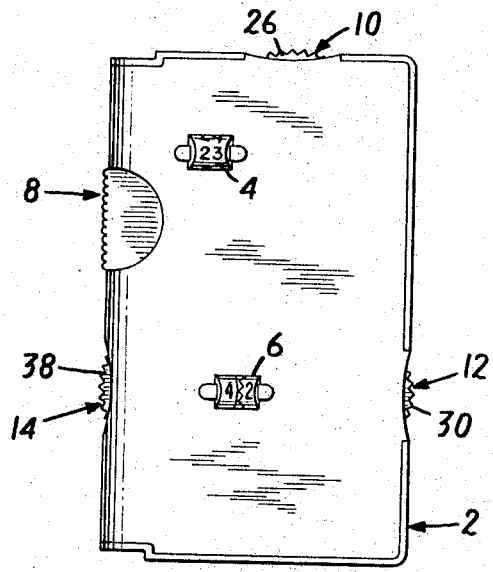
FIG. 1 is a front elevation view of one embodiment of the present invention.

Referring to FIG. 1 of the drawings, a representative embodiment of the invention in the form of a calorie counter includes a casing 2, which may suitably be of a moulded plastic material, in the front wall of which two windows 4 and 6 are provided, the windows preferably being covered with transparent plastic material. Projecting beyond the casing 2 is the head of a plunger 8 and the edge portions of three scale-bearing wheels 10, 12 and 14. The casing is of a size which will fit comfortably in a pocket or a handbag.

Figure 2:
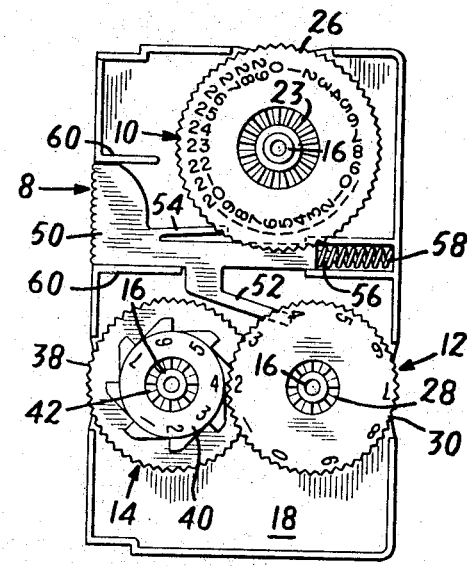
FIG. 2 is a front elevation view of the embodiment of FIG. 1 showing the front wall removed for clarity.
Figure 3:
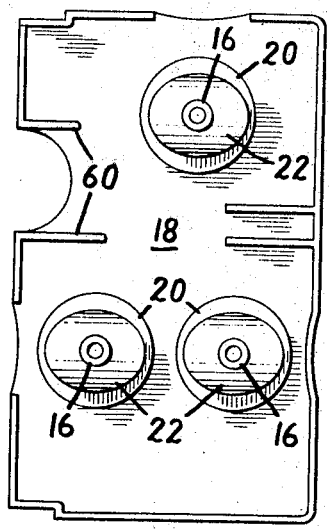
FIG. 3 is a front elevation view of the rear wall of the embodiment of FIG. 1 showing the spring washers in position.
Figures 5, 7:
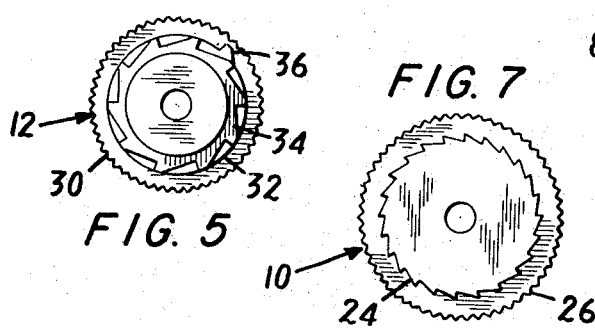
FIG. 5 is a rear detail view of the second ratchet wheel.
FIG. 7 is a rear detail view of the first ratchet wheel.

The relative arrangement of the wheels 10, 12 and 14 is best seen in FIG. 2. Each of the wheels is rotatably mounted on a spindle 16, which projects from the rear internal face 18 of the casing 2 and passes through a central opening in the wheel, and is positioned above the plain and bowed spring washers 20 and 22, respectively (see FIG. 3). The wheel 10 bears on its upper surface a graduated scale comprising a series of numbers arranged peripherally from 0 to 29. The center portion 23 of the wheel is indented and is provided with radial serrations, each serration radially pointing to one of the numbers on the scale; i.e., there are 30 serrations. The underside of the wheel 10 (see FIG. 7) is cut away to form a ratcheted periphery 24 concentric with the serrated outer edge 26 of the wheel, each ratchet tooth corresponding to a number on the scale.

The wheel 12 bears on its upper surface a peripheral scale graduated from 0 to 9 and has a central indented portion 28 provided with radially disposed serrations corresponding to each of the ten numbers on the scale. The underside of the wheel 12 (see FIG. 5) shows that disposed concentrically with the serrated outer edge 30 of the wheel 12 and integral therewith are a first wheel 32 with a single tooth 36 and a second wheel 34 having ten ratchet teeth corresponding to each of the numbers on the scale. The third wheel 14 (see FIG. 2) has a serrated outer edge 38 and a raised ratcheted front portion 40 concentric with the edge 38 carrying a peripheral scale graduated from 1 to 7 and provided with ratchet teeth corresponding to each one of the numbers on the scale. The central portion 42 is indented and provided with radially extending serrations to also correspond with the numbers on the scale.

Figure 4:
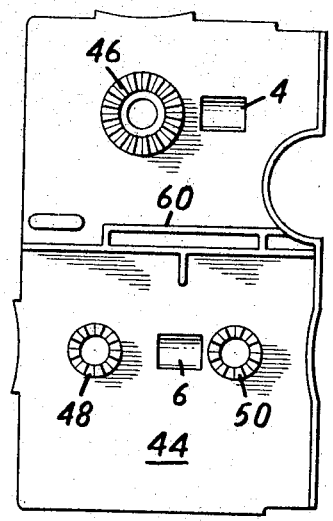
FIG. 4 is a rear elevation view of the front wall of the embodiment of FIG. 1.

The front wall 44 of the casing 2 (see FIG. 4) is moulded so as to have three rearwardly extending circular projections 46, 48 and 50, each having radial serrations corresponding respectively with the serrated indentations 23, 28 and 42 in the respective wheels 10, 12 and 14. The serrated portions 23, 28 and 42 of the wheels are resiliently held in engagement with the corresponding projections 46, 48 and 50 by the spring washers 22 so that the wheels may be advanced through one scale graduation at a time without slippage; i.e., in a step-by-step manner.

Figure 6:
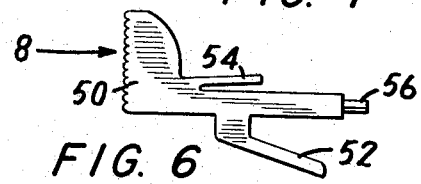
FIG. 6 is a front detail view of the plunger.

The plunger 8 is of the form shown in FIG. 6 and comprises an operating head 50, two projecting arms 52 and 54 and a terminal knob 56 for engagement with a compression spring 58 (see FIG. 2). Both the rear wall 18 and the front wall 44 of the casing 2 have moulded guides 60 for keeping the plunger 8 in position during its stroke. The guides 60 restrain the plunger 8 to reciprocating movement along a line between the axes of the wheels 10 and 12.

In operation, depression of the plunger 8 toward the body of the casing causes the arm 54 to strike a tooth of the ratchet wheel 24 on the wheel 10 and move it through one scale graduation in a counter-clockwise direction while the arm 52 simultaneously strikes a tooth of the ratchet wheel 34 on the wheel 12 and moves it through one scale graduation in a clockwise direction. When pressure on the plunger is released, it is returned to its rest position by means of the spring 58. After the plunger has been depressed ten times, the projection 36 on the wheel 12 engages the ratchet wheel 40 on the wheel 14 and moves it through one scale graduation. Thus, while wheel 12 indicates units through the window 6, the wheel 14 indicates tens. The wheel 14 may be eliminated, of course, if a ten's indicator is not needed. The reading on the wheel 10, which indicates the number of times the plunger 8 has been depressed, is shown through window 4.

As previously mentioned, the serrated edges 26, 30 and 38 of the wheels 10, 12 and 14, respectively, extend beyond the casing 2 (see FIG. 2) which is provided with openings for this purpose. Accordingly, each wheel may be manually rotated to any desired scale number and the wheels 12 and 14 may be preset to indicate a predetermined total. Because the wheels 10 and 12 are rotated in opposite directions by the plunger 8, the number of plunger operations will be automatically recorded by the wheel 10 and automatically subtracted from the number preset on wheels 12 and 14, thus registering a progressively declining balance.

The counting device is particularly useful, for example, for calorie counting. For this purpose the user is provided with a paper or booklet showing the approximate calorie values of fattening foods on some convenient scale which is correlated with the scales of the counter. For example, steak pudding might rank as 24 units on the scale, an apple as 12 units, and so on. The wheels 12 and 14 are set initially to indicate the total number of calories on the scale for consumption in any one day. The wheel 10 is set to 0. Upon consuming a food item, the user depresses the plunger once for each unit of calorie value consumed, which is read on the wheel 10 through the window 4. The number on the calorie value scale still remaining from the daily quota may then be read on the wheels 12 and 14 through the window 6. The wheel 10 may be adjusted back to 0 after each item has been counted, while the wheels 12 and 14 will carry a running total for the day of the calorie value left in the quota. The projecting portions of the wheels 10, 12 and 14 enable them to be zeroed at the end of the day.

An extra casing leaf (not shown) may be provided on the rear wall 18 and may be pivoted to the casing 2 to enable the leaf to be opened to reveal information concerning the calorie counter, for example, or the paper or booklet referred to.

It will be understood by those skilled in the art that the above-described embodiment is intended to be merely exemplary, in that it is susceptible of modification and variation without departing from the spirit of the invention. While the invention has been described and illustrated in the form of a calorie-counting device, it may be used for any purpose, and take any suitable configuration, where it is desired to register a total or to indicate a declining balance.

I claim:

1. A counting device comprising a casing, a plunger projecting from the casing and mounted therein for reciprocating movement, means carried by the casing for biasing the plunger outwardly of the casing, first and second wheels rotatably mounted in the casing, each of the wheels having a predetermined number of circumferentially spaced ratchet teeth and a correspondingly graduated scale and being selectively positionable at a preset amount, windows in the casing for reading each of the scales, and finger means carried by the plunger for engaging the ratchet teeth of each of the wheels to cause the wheels to move by one scale graduation for each operation of the plunger, the wheels being arranged so that the scale on the first wheel records the number of plunger operations which have been made while the scale on the second wheel records the difference after subtraction of this number from a preset amount.

2. A counting device as defined in claim 1 wherein the plunger is mounted to operate along a line between the axes of the wheels, and wherein the finger means comprises two fingers located one on each side of the plunger, so that operation of the plunger moves the wheels in opposite directions of rotation.

3. A counting device as defined in claim 2 wherein a third wheel is rotatably mounted in the casing, said third wheel having a predetermined number of circumferentially spaced ratchet teeth and a correspondingly graduated scale, and wherein means are provided on the said second wheel for engagement with the ratchet teeth of the said third wheel to move the said third wheel by one scale graduation for each revolution of the said second wheel.

4. A counting device as defined in claim 3 wherein the periphery of each wheel projects beyond the casing, whereby each scale can be manually zeroed or set to a desired value.

5. A counting device as defined in claim 3 wherein a plurality of radial serrations are formed on the front surface of each of the wheels, the number of serrations corresponding to the graduations of the respective scales, and wherein each wheel is resiliently mounted between a spring washer carried by the rear wall of the casing and a rearwardly extending projection carried by the front wall of the casing, each of the rearwardly extending projections having radial serrations formed on its inner surface in correspondence with the respective radial serrations of the respective wheels, whereby the wheels may be rotated by one scale graduation at a time.

References Cited

UNITED STATES PATENTS

| | | | |
|---|---|---|---|
| 410,242 | 9/1889 | Hartley | 235—132 |
| 1,208,486 | 12/1916 | Clifford | 235—114 X |
| 1,750,456 | 3/1930 | Borm | 235—114 X |
| 2,548,837 | 4/1951 | Wright | 273—142 |
| 2,771,694 | 11/1956 | Laughton | 40—70 X |
| 3,110,116 | 11/1963 | Ezra | 35—74 X |
| 3,312,395 | 4/1967 | Nara | 235—114 |

RICHARD B. WILKINSON, Primary Examiner

STANLEY A. WAL, Assistant Examiner

U.S. Cl. X.R.

116—133